United States Patent [19]

Vandenabeele et al.

[11] Patent Number: 5,754,535

[45] Date of Patent: May 19, 1998

[54] METHOD FOR TDMA MANAGEMENT, CENTRAL STATION, TERMINAL STATION AND NETWORK SYSTEM TO PERFORM THIS METHOD

[75] Inventors: Peter Vandenabeele, Lier; Christiaan Hendrik Jozef Sierens, Mortsel; Gert Van Der Plas, Merchtem, all of Belgium; Cornelis Krijntjes, Bergen op Zoom, Netherlands

[73] Assignee: Alcatel N.V., Rijswijk, Netherlands

[21] Appl. No.: 636,236

[22] Filed: Apr. 23, 1996

[30] Foreign Application Priority Data

Apr. 28, 1995 [EP] European Pat. Off. ............ 95201108

[51] Int. Cl.⁶ ........................... H04J 3/02; H04B 10/207
[52] U.S. Cl. ........................... 370/321; 370/347; 370/458; 370/442
[58] Field of Search ........................... 370/449, 437, 370/442, 458, 461, 443, 321, 324, 326, 336, 337, 345, 347, 348, 498, 503, 507, 350, 389, 395, 486, 425, 446; 340/825.5, 825.08

[56] References Cited

U.S. PATENT DOCUMENTS

| | | | |
|---|---|---|---|
| 4,570,257 | 2/1986 | Olson et al. | 370/442 |
| 4,630,267 | 12/1986 | Costes et al. | 370/324 |
| 4,932,024 | 6/1990 | Bonicioli et al. | 370/458 |
| 5,072,445 | 12/1991 | Nawata | 370/442 |
| 5,142,532 | 8/1992 | Adams | 370/458 |
| 5,172,375 | 12/1992 | Kou | 370/324 |
| 5,278,831 | 1/1994 | Mabey et al. | 370/458 |
| 5,353,285 | 10/1994 | Van Der Plas et al. | 370/443 |

FOREIGN PATENT DOCUMENTS

| | | |
|---|---|---|
| 0337619 | 10/1989 | European Pat. Off. |
| 0371500 | 6/1990 | European Pat. Off. |
| 0593812 | 4/1992 | European Pat. Off. |
| 0544975 | 6/1993 | European Pat. Off. |
| 9319540 | 9/1993 | WIPO |

OTHER PUBLICATIONS

English Language Abstract of EPO 0511614 A2.
"Asynchronous Transfer Mode Transmission on a Passive Optical Home Network", M. van Vaalen, *Cable TV Sessions*, Jun. 13-16, 1991, Montreux, No. Symp. 17, 14 Jun. 1991 CCITT, pp. 97-107.

*Primary Examiner*—Douglas W. Olms
*Assistant Examiner*—Chau T. Nguyen
*Attorney, Agent, or Firm*—Ware, Fressola, Van Der Sluys & Adolphson LLP

[57] ABSTRACT

To allocate time slots to terminal stations (T1 ... Ti ... Tn) for transmission of upstream burst (UB) in a network system wherein a central station (CS) is coupled to a plurality of terminal stations (T1 ... Ti ... Tn), the central station (CS) downstream transmits access grant information (AGI) which forms part of downstream frames (DE). Each terminal station (Ti) is equipped with a cyclic local grant counter (LGC) which generates a local grant counter value between zero and a predetermined limit, and which is synchronized with a cyclic master grant counter (MGC) included in the central station (CS). The upstream time slots are bounded by two zero crossings of the cyclic local grant counter (LGC) and a terminal station (Ti) is allowed to transfer an upstream burst (UB) in such a time slot provided that this time slot is allocated to the terminal station (Ti) via previously received access grant information (AGI).

16 Claims, 4 Drawing Sheets

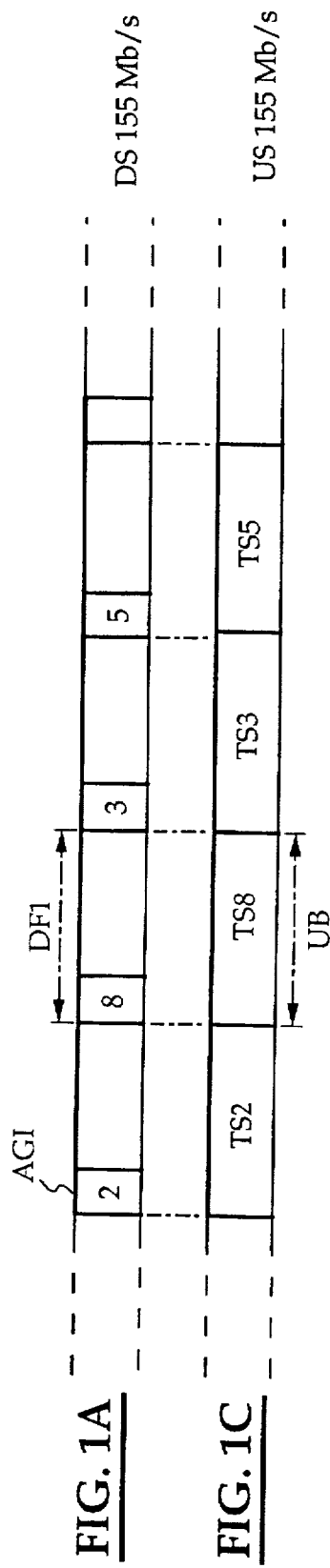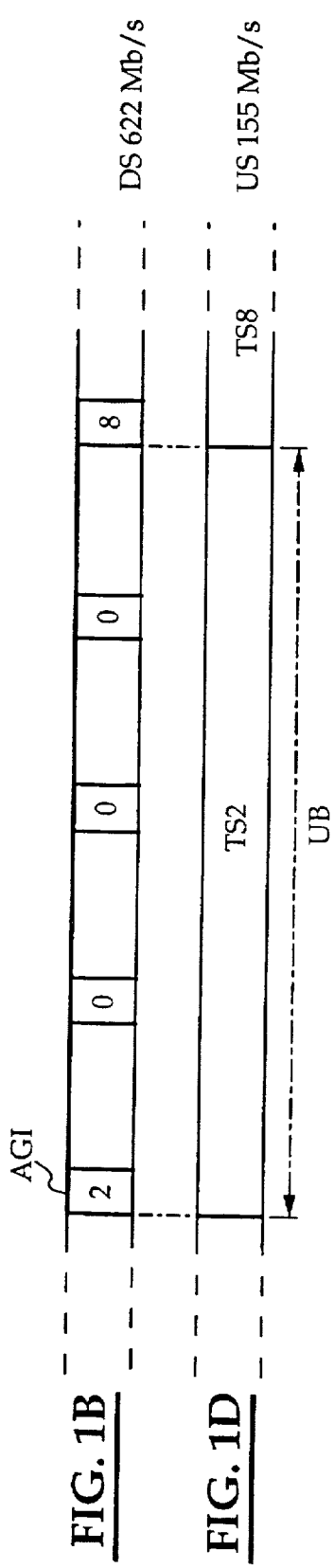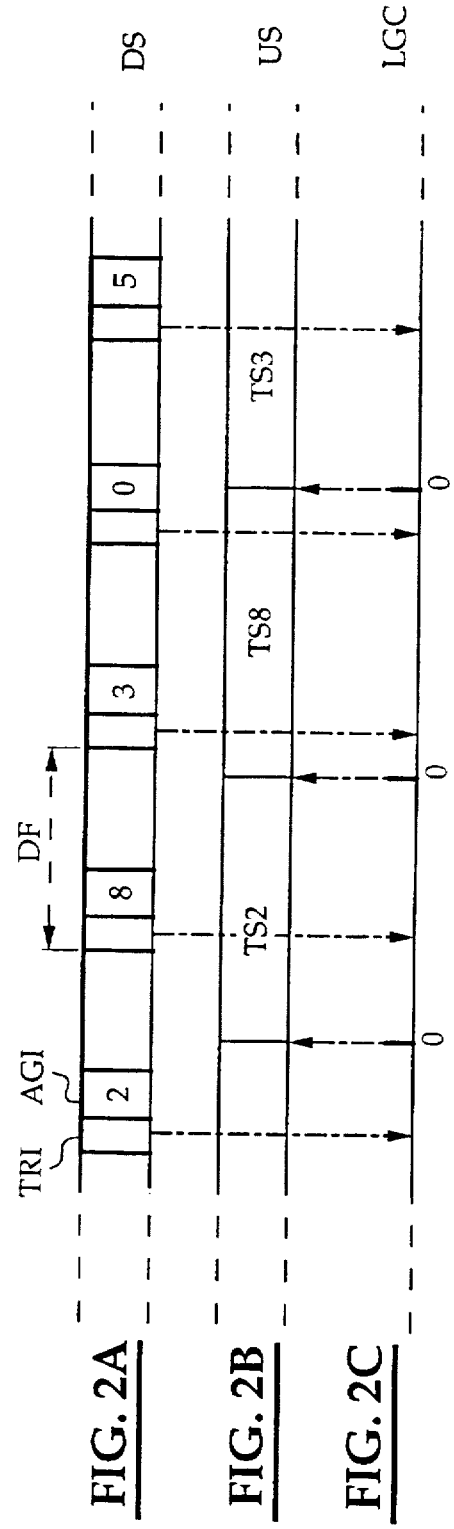

METHOD FOR TDMA MANAGEMENT, CENTRAL STATION, TERMINAL STATION AND NETWORK SYSTEM TO PERFORM THIS METHOD

TECHNICAL FIELD

The present invention relates to a method, a central station, a terminal station and a network system for time division multiple access (TDMA) management.

BACKGROUND OF THE INVENTION

Such a method, central station, terminal station and network system are already known in the art, e.g. from the published European, Patent Application EPA 0544975. Therein, a system, called a time slot management system, comprises a central station referenced to as a main station and a plurality of terminal stations named substations. To enable the substations to transfer upstream bursts or upstream information packets, time slots are allocated to these substations by means of access grant information, referred to as transmit enable addresses. The access grant information is generated in the central station and transmitted to the terminal stations. Similar time division multiple access (TDMA) methods used in the field of satellite communications or mobile communications are described in the European Patent Applications EPA 0371500 and EPA 0511614 respectively. In the known solutions, the downstream transmitted access grant information is aligned with the downstream frames whereof it forms part and with the upstream bursts since the transmission of the latter bursts from a terminal station to the central station is triggered by the arrival of the access grant information in this terminal station. As a result, the known solutions lack flexibility with respect to downstream frame length, upstream burst length and downstream to upstream bit rate ratio.

DISCLOSURE OF INVENTION

An object of the present invention is to provide a time division multiple access (TDMA) method of the above known type but wherein downstream frame length and upstream burst length are independent from each other and wherein downstream and upstream bit rate may have a non integer ratio.

According to a first aspect of the present invention, a method for time division multiple access management in a system comprising a central station coupled to each of a plurality of terminal stations, said central station being enabled to transmit downstream frames to said terminal stations and to allow said terminal stations to transfer upstream bursts to said central station in time slots assigned thereto by means of access grant information included in said downstream frames, is characterized in that a time slot of said time slots is bounded by a first and a second zero crossing of a cyclic local grant counter, included in each of said terminal stations to generate a local counter value between zero and a predetermined number, and that a terminal station of said terminal stations is allowed to transfer a burst of said upstream bursts during said time slot, provided that said time slot became allocated to said terminal station by said access grant information before said first zero crossing, said cyclic local grant counter being synchronized with a cyclic master grant counter included in said central station to generate a counter value between zero and said predetermined number.

According to a second aspect of the present invention, a central station for a time division multiple access system, said central station being coupled to a plurality of terminal stations and including a multiplexer to an input of which digital data are applied and to another input of which access grant information, generated by a processor which also forms part of said central station, is applied, said multiplexer being adapted to multiplex said digital data and said access grant information to thereby generate downstream frames applied to a downstream modulator, adapted to modulate said downstream frames, is characterized in that said central station further includes a cyclic master grant counter adapted to generate a counter value clocked on activation of a clock, a terminal station of said terminal stations for transferring an upstream burst during a time slot bounded by a first and a second zero crossing of a cyclic local grant counter included in said terminal station, provided that said time slot became allocated to said terminal station by said access grant information before said first zero crossing, said cyclic local grant counter further being synchronized with said cyclic master grant counter.

According to a third aspect of the present invention, a terminal station for a time division multiplex system wherein a central station is coupled to a plurality of terminal stations similar to said terminal station, said terminal station including a downstream demodulator provided to demodulate downstream frames transmitted from said central station to said terminal stations, and a demultiplexer coupled to said downstream demodulator to demultiplex said downstream frames and to thereby generate digital data provided from an output thereof and access grant information provided from a further output thereof, is characterized in that said terminal station further includes a cyclic local grant counter provided to generate a counter value between zero and a predetermined number, said cyclic local grant counter being synchronized with a cyclic master grant counter included in said central station, an access grant buffer coupled to said further output of said demultiplexer to temporarily store said access grant information, and an upstream modulator adapted to modulate and transfer an upstream burst to said central station between a first and a second zero crossing of said cyclic local grant counter provided that a time slot was allocated to said terminal station via said access grant information previous to said first zero crossing.

According to a fourth aspect of the present invention, a network system for time division multiple access including a central station coupled to a plurality of terminal stations, said central station including a multiplexer to an input of which digital data are applied and to another input of which access grant information, generated by a processor which also forms part of said central station, is applied, said multiplexer being adapted to multiplex said digital data and said access grant information to thereby generate downstream frames applied to a downstream modulator, adapted to modulate said downstream frames, and each said terminal station including a downstream demodulator provided to demodulate said downstream frames, and a demultiplexer coupled to said downstream demodulator to demultiplex said downstream frames and to thereby generate said digital data provided at an output thereof and said access grant information provided at a further output thereof, is characterized in that said central station further includes a cyclic master grant counter adapted to generate a counter value clocked on activation of a clock, and each said terminal station further includes a cyclic local grant counter provided to generate a counter value between zero and a predetermined number, said cyclic local grant counter being synchronized with said cyclic master grant counter, and access grant buffer coupled to said further output of said demultiplexer to temporarily store said access grant information, and an upstream modulator adapted to modulate and transfer an upstream burst to said central station between a first and a second zero crossing of said cyclic local grant counter provided that a time slot was allocated to said terminal station via said access grant information previous to said first zero crossing.

By starting transfer of the upstream bursts at a zero crossing of the local grant counter, there is no need for aligning the access grant information with the upstream bursts and with the downstream frames, the upstream burst length and bit rate thus becoming independent from the downstream frame length and bit rate respectively. Indeed, in the present method, transmission of upstream bursts is no longer triggered by the reception of the access grant information but by the zero crossing of the cyclic local grant counter having a predetermined number as count limit, provided access was granted previous to the zero crossing. The upstream burst length may thus be increased or decreased independently from the downstream frame length by increasing or decreasing the predetermined number respectively. To enable reception of the upstream bursts in the central station, this central station has to be provided with a master grant counter, with which all local grant counters in the terminal stations are synchronized.

In the present time division multiple access (TDMA) method, the access grant information might be downstream transmitted at any time but has to be received by the terminal station assigned in this access grant information previous to the zero crossing of the local grant counter which corresponds to the beginning of the time slot allocated to this terminal station. The terminal station in the present invention is thus allowed to transfer upstream bursts only at zero crossing of its local grant counter whereby its access grant buffer is not empty.

Another characteristic feature of the present time division multiple access (TDMA) management method is that, the master grant counter is clocked at downstream transmission of each byte. In this way, synchronization of the master grant counter and local grant counters is obtained easily by increasing or decreasing the local grant counter values at reception of each downstream transmitted byte.

A further characteristic feature of the present method is that the local grant counter value can be restored in case synchronization with the master grant counter value is lost. Indeed, time reference information generated by the master grant counter can be downstream transmitted and compared in each terminal station with the local grant counter value. Comparator means and e.g. a state machine can be included in the terminal stations to detect loss of synchronism and to restore the local grant counter value to obtain synchronization again respectively.

Still another characteristic feature of the present invention is that a bit of the access grant information (AGI) might be used to inform a terminal station about the fact that the most recently transmitted upstream burst is corrupted by transmission errors. As a result, in selected implementations, the central station requests the terminal station for a new transmission of the last upstream burst.

Different implementations of the present method are described without limitation below. The present invention is indeed realized by transmitting the access grant information aligned with the downstream frames but not necessarily aligned with the upstream bursts, or by transmitting the access grant information at equidistant time intervals aligned with the upstream bursts but not necessarily aligned with the downstream frames.

When aligned with the downstream frames, the access grant information can be made available faster to the terminal stations in those network systems wherein the downstream frames are interleaved in the central station and deinterleaved in the terminal stations. This additional feature is described below. To interleave the downstream frames, individual bytes of these frames are given different delays according to their positions in these downstream frames. In this way, burst errors on a transmission link are spread out over different downstream frames and can be corrected at the terminal stations with a minimum of error code bytes included in each of the downstream frames. By giving the access grant information these positions in the downstream frames which are not delayed during the interleaving and by recovering the access grant information in the terminal stations before deinterleaving is performed, the access grant information becomes available quickly and is transmitted from central station to terminal station with less delay than the average delay introduced by the interleaving.

When aligning the access grant information with the upstream frames as is described below, it should be avoided that overhead bytes which form part of the downstream transmitted frames are disturbed by the access grant information. Therefore it will be impossible to always transmit the access grant information at fixed time intervals. To prevent damaging overhead bytes, these overhead bytes could be included in the downstream frames after time equidistant insertion of the access grant information or alternatively, as also described below, the predetermined time intervals may equal a second fixed time interval instead of a first fixed time interval whenever the access grant information, when inserted after the first fixed time interval, would damage the overhead bytes. In the terminal stations the first and second fixed time intervals are known in such a way that the access grant information can be found in the downstream frames even if it is not located at the first fixed time interval.

These and other objects, features and advantages of the present invention will become more apparent in light of the detailed description of a best mode embodiment thereof, as illustrated in the accompanying drawing.

BRIEF DESCRIPTION OF THE DRAWING

FIGS. 1A and 1B are representations of downstream frame structures and FIGS. 1C and 1D are representations of associated upstream burst structures according to the known solutions;

FIG. 2A is a representation of a downstream frame structure, FIG. 2B an upstream burst structure, and FIG. 2C shows a common time reference line showing zero crossings of a cyclic local grant counter in a first embodiment of the network system according to the present invention;

BEST MODE FOR CARRYING OUT THE INVENTION

Figures 3A, 3B, 3C, 3D, 4A, 4B, 4C:
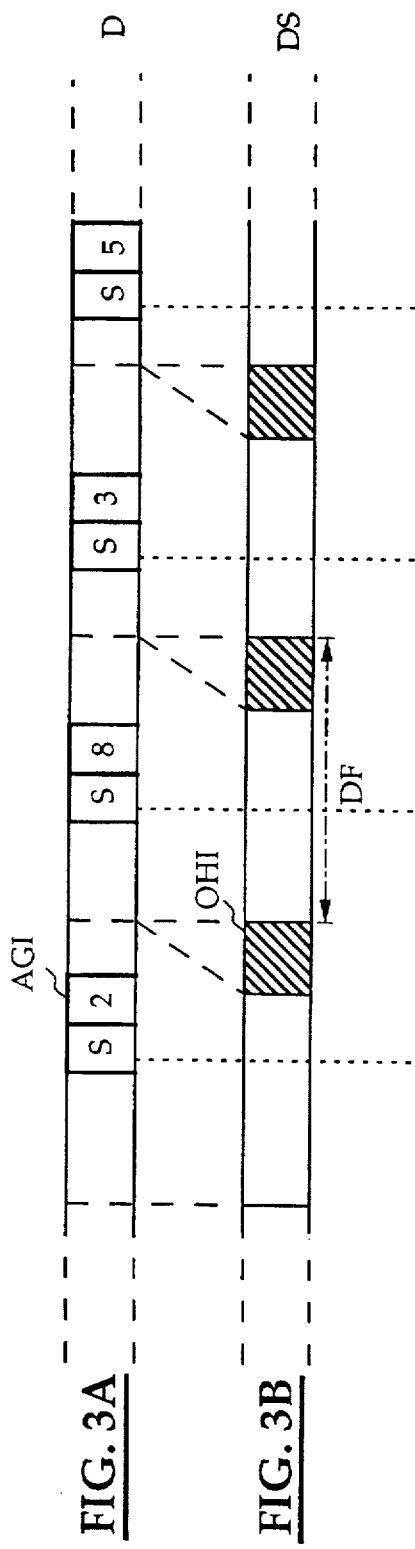
FIGS. 3A–3D are a representation of a downstream frame structure and an upstream burst structure in a second embodiment of the network system according to the present invention.
FIGS. 4A–4C are a representation of a downstream frame structure and an upstream burst structure in a third embodiment of the network system according to the present invention.

FIG. 1A and FIG. 1B show a downstream frame stream DS and FIGS. 1C and 1D a respective upstream burst stream US structure as used in known network systems wherein downstream frames DF are transmitted from a central station to a plurality of terminal stations over the cascade connection of a common transmission path and an individual transmission path, and wherein upstream bursts UB or upstream packets are transferred from the terminal stations to the central station via time division multiple access (TDMA). Such a network is used e.g. for interactive services such as video on demand. In FIG. 1A the upstream and downstream bit rates are equal to 155 Mb/s. In FIG. 1B on the other hand, the downstream bit rate is equal to 622 Mb/s, while the upstream bit rate is lower by a factor of four and equals 155 Mb/s as shown in FIGS. 1C and 1D. These specific bit rates are used in known optical transmission networks. The upstream channel is shared by the plurality of terminal stations and is thereto divided in time slots, TS2, TS8, TS3, TS5, allocated to the terminal stations by means of access grant information AGI included in the downstream frame stream DS.

The downstream frames DF in the known systems comprise access grant information AGI and data including both payload data and overhead data. The contents of the upstream bursts UB in FIG. 1C and FIG. 1D is not further specified as it is not relevant for the subject invention. The access grant information AGI occupies equal positions in each downstream frame DF and is thus aligned with these downstream frames DF. The terminal station which is allocated a time slot, is triggered to transfer an upstream burst UB by the reception of the access grant information AGI. The access grant information AGI is therefore also aligned with the upstream time slots. As a result, the downstream frame length and the upstream time slots are submitted to specific conditions: in the implementation of FIGS. 1A and 1C where the upstream and downstream bit rates are equal, the upstream time slots necessarily equal the downstream frame length. In FIGS. 1B and 1D, the upstream time slots need to be 4 times as large as the downstream frame length. In the latter implementation, only 1 of each 4 downstream frames DF includes access grant information AGI different from zero and thus really allocates an upstream time slot to a terminal station.

From FIGS. 1A & 1C and FIGS. 1B & 1D and the above paragraphs, it is clear that network systems wherein the transmission of access grant information AGI is synchronized with the downstream frames DF as well as with the upstream bursts UB, lack flexibility in frame length and bit rate. Therefore, in the following paragraphs, first, implementations of downstream and upstream burst stream structures and their use according to the present invention, which do not lack such flexibility, are described and thereafter a detailed description is given of a network system using these structures and of the components thereof.

In a first implementation of the present invention, access grant information AGI is transmitted still aligned with the downstream frames DF but unaligned with the upstream time slots, TS2, TS8, TS3.

Figure 5:
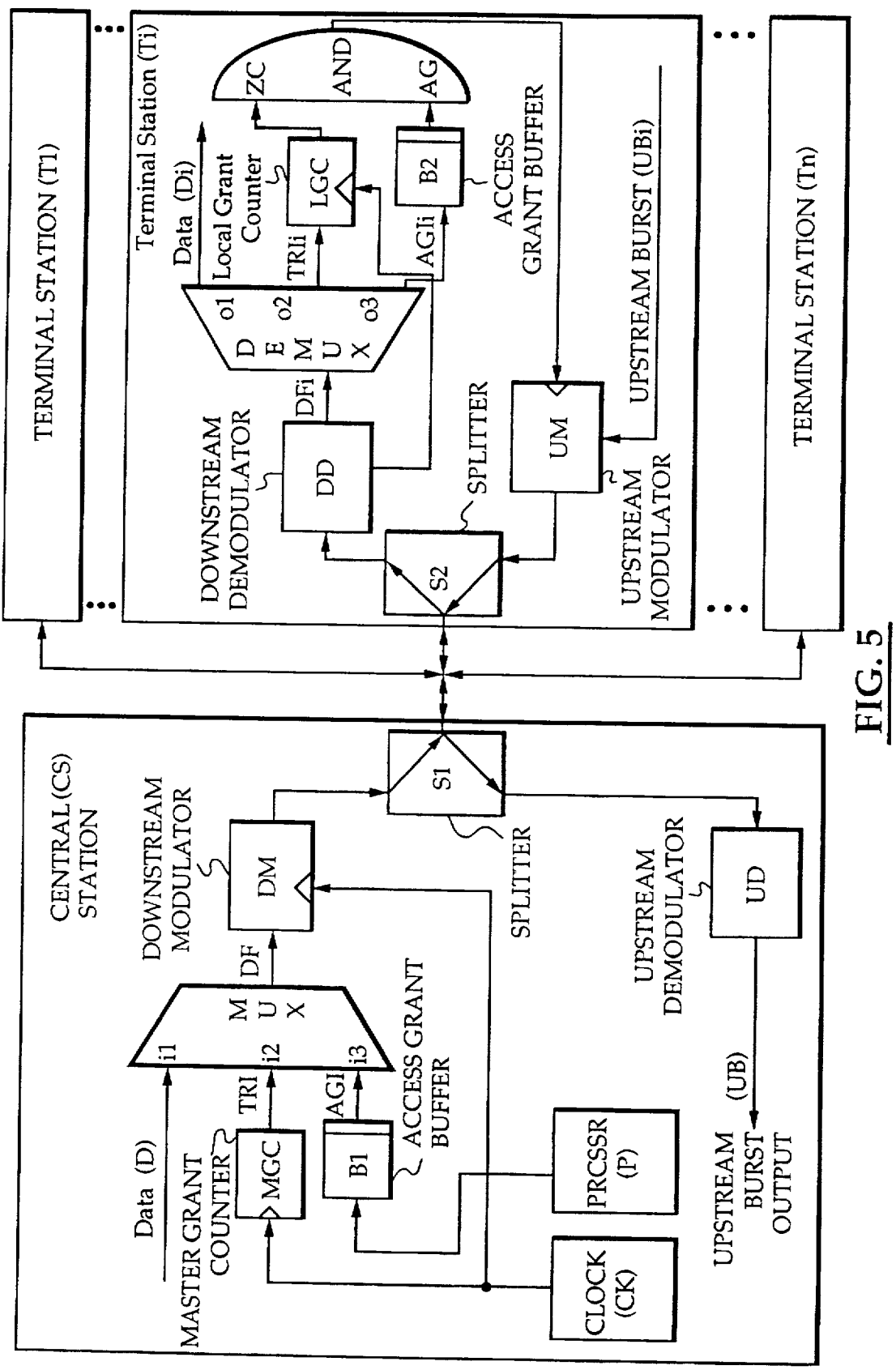
FIG. 5 is a block scheme of an embodiment of the network system according to the present invention.

The downstream frames DF, as shown in FIG. 2A, include access grant information AGI, time reference information TRI and data comprising overhead data and payload data. The time reference information TRI represents a copy of the counter value of a cyclic master grant counter MGC included in the central station CS as shown in FIG. 5 at the moment of transmission of this time reference information TRI. The value of this master grant counter MGC is increased by 1 each time a byte is transmitted downstream. Each terminal station is provided with a cyclic local grant counter (LGC) which generates a local grant counter value, increased from zero to a predetermined upper limit. The local grant counter value therefore is increased by 1 each time a downstream byte is received by the respective terminal station whereof it forms part.

The time reference information TRI received from the central station is used in the terminal stations to overwrite the local grant counter value in order to obtain synchronization of the cyclic local grant counter with the cyclic master grant counter. In another embodiment, described later on by means of FIG. 6, the time reference information TRI is compared with the local grant counter value (see downward arrows from FIG. 2A to FIG. 2C) in a state machine included in the terminal stations. The local grant counter value is then adapted only when synchronism is lost and not permanently.

After receipt of the access grant information AGI, a terminal station may transmit data in time slots for upstream bursts UB that are bounded by two successive zero crossings of the cyclic local grant counters. This is illustrated by the upward arrows from FIG. 2C to FIG. 2B which indicate that terminal station 2 transmits an upstream burst UB during a time slot TS2, terminal station 8 transmits an upstream burst UB during a time slot TS8, and terminal station T3, transmits an upstream burst UB during a time slot TS3.

It should be noticed that access grant information AGI which is received before the beginning of an upstream time slot that is already allocated to a terminal station by previously transmitted access grant information AGI, is filled with zero. If however, which is not shown in FIGS. 2A–2C the downstream frames DF are longer than the upstream time slots, the access grant information AGI in a single downstream frame DF might allocate a plurality of time slots to a plurality of terminal stations.

It is further remarked as shown in FIGS. 2B and 2C, that an upstream time slot in the time division multiple access (TDMA) method according to the present invention is bounded by a first and second zero crossing of a cyclic local grant counter which are not necessarily successive zero crossings. In this way, longer time slots can be allocated to services or terminal stations which require a large upstream bandwidth.

From the above paragraphs, it follows that the upstream burst length is dependent only on the cyclic local and master grant counters, and is changed easily by increasing or decreasing the upper limit of these counters. From the above, it is also clear that each terminal station has to include an access grant buffer to store the received access grant information (AGI) from the reception thereof to the first zero crossing of its cyclic local grant counter.

It has to be remarked that in an alternative embodiment of the above mentioned network system, the cyclic local grant counter and the cyclic master grant counter may be decreasing counters instead of increasing counters. The time reference information TRI in such an embodiment would then represent the delay be taken into account with respect to the beginning of the next upstream time slot in counter units.

Furthermore, in another specific embodiment of the above described network system wherein the downstream frames DF are interleaved in the central station and deinterleaved in the terminal stations, the access grant information AGI can be made available to the terminal stations with less delay than the average delay introduced by the interleaving.

Indeed, a plurality of downstream frames DF are interleaved to spread out burst errors over this plurality of downstream frames DF thereby enabling correction of these burst errors with a minimum of error correction coding added to the downstream frames DF. To interleave the downstream frames DF, individual bytes are given different delays according to their position in the frames DF. By embedding the access grant information AGI in positions of the frames DF which are transmitted without delay, and by recovering the access grant information AGI from the downstream frame stream DS before deinterleaving is executed, the access grant information AGI becomes available very quickly to the terminal stations.

A well known problem with upstream transmission is burst errors. Error correction coding in combination with interleaving is no solution hereto since the upstream bursts UB from different terminals are independent and can not be combined. In accordance with the present invention, upstream burst errors are corrected via retransmission. An error detecting code added to the upstream bursts UB allows the central station to detect burst errors. The central station then sets a retransmission bit which is included thereto in the access grant information AGI. At reception of the access grant information AGI, the terminal station recognizes that the retransmission bit is set and retransmits the last transmitted upstream burst UB. To allow this retransmission, each terminal station is equipped with a buffer, not shown in the figures, to temporarily store its last transmitted upstream burst UB. The retransmission bit necessarily has to be received by the terminal station before a new upstream burst UB is transmitted thereby.

In still another implementation of the present invention, the access grant information AGI is aligned with the upstream bursts UB but not necessarily with the downstream frames DF. The structure of downstream frame streams DS and upstream burst streams US according to this second implementation are shown in FIGS. 3A–3D and FIGS. 4A–4C.

The central station and terminal stations in the network system corresponding to this second implementation also include a cyclic master grant counter and cyclic local grant counters respectively. The access grant information AGI is included in the downstream frames DF at zero crossings of the master grant counter and therefore appear unaligned in the downstream frames DF at equidistant time intervals. Upstream bursts UB are transmitted at the arrival of the access grant information AGI. In the downstream frames DF, the access grant information AGI is preceded by a sync byte S which is searched for at the terminal stations. Such a sync byte S is necessary to enable the terminal stations to recognize the first access grant information AGI. Otherwise, a terminal station cannot distinguish the access grant information AGI from other data in the downstream frames DF. In other words, the terminal stations become synchronized to the central station via the sync byte S.

Part of the data transmitted in downstream frames DF is overhead information OHI. By including the access grant information AGI in an unaligned way in the downstream frames DF, this overhead information OHI might be damaged if no precautions are taken.

In the embodiment according to FIG. 3A–3D, damage of overhead information OHI is avoided by including the sync byte S and access grant information AGI at equidistant time intervals in a data stream D, which is then embedded in the payload sections of the downstream frames DF. As a result, the overhead sections of these downstream frames DF can not be destroyed. The embedment of the data stream D in the payload sections implies a bit rate adaptation which is performed by a phase locked loop in combination with a buffer according to a well known mechanism.

In an alternative embodiment according to FIGS. 4A–4C, the sync byte S and access grant information AGI are included in the downstream frames DF at a first fixed time FT1 interval or at a second fixed time interval FT2 if overhead information OHI is deemed to be damaged when the sync byte S and the access grant information AGI are included at the first fixed time interval FT1. The terminal stations in this embodiment of the network system are adapted to search for the sync byte S after the first FT1 and second fixed time interval FT2 and are thus always able to find the access grant information AGI. Compared to the above alternative, this embodiment has the advantage that no phase locked loop has to be provided.

Referring to FIG. 5 an embodiment of a network system according to the present invention will be described in detail.

The network system shown includes a central station CS coupled to a plurality of terminal stations, T1 ... Ti ... Tn, via the cascade connection of a common transmission link and an individual transmission link. Of these terminal stations only Ti is shown in detail, the other stations being identical. The central station CS includes a clock unit CK, a processor P, a cyclic master grant counter MGC, an access grant buffer B1, a multiplexer MUX, a downstream modulator DM, an upstream demodulator UD and an upstream/downstream splitter S1. The terminal station Ti is equipped with an upstream/downstream splitter S2, an upstream modulator UM, a downstream demodulator DD, a demultiplexer DEMUX, a cyclic local grant counter LGC, an access grant buffer B2 and a logical "and" gate AND.

In the central station CS, a first input i1 of the multiplexer MUX is a data input D. An output of the cyclic master grant counter MGC and an output of the access grant bufferr B1 are coupled to a second i2 and third input i3 of the multiplexer MUX respectively. Via the downstream modulator DM, an output of the multiplexer MUX is coupled to the upstream/downstream splitter S1 which is in the upstream direction further coupled to an upstream burst output UB via the upstream demodulator UD. An output of the clock unit CK is connected to control inputs of the cyclic master grant counter MGC and of the downstream modulator DM respectively, while a processor output of P is coupled to an input of the access grant buffer B1.

In Ti, the transmission links are coupled to the demultiplexer DEMUX via the cascade connection of the upstream/downstream splitter S2 and the downstream demodulator DD. A first output o1 of the demultiplexer DEMUX is a data output, while second o2 and third outputs o3 thereof are coupled to the cyclic local grant counter LGC and access grant buffer B2 respectively. An output of the cyclic local grant counter LGC is connected to a zero crossing input ZC of the logical "and" gate AND, while an output of the access grant buffer B2 is connected to an access grant input AG of this logical "and" gate AND, whose output is coupled to a control input of the upstream modulator UM which couples an upstream burst input UBi to the upstream/downstream splitter S2. A clock output of the downstream modulator DD and a control input of the cyclic local grant counter LGC are also interconnected.

In CS, data D, time reference information TRI and access grant information AGI are multiplexed into downstream frames DF and therefore applied to the first i1, second i2 and third input i3 of the multiplexer MUX respectively. On activation of a clock signal applied to its control input, the downstream modulator modulates these downstream frames DF and applies them to the upstream/downstream splitter S1. Also under the control of this clock signal the cyclic master grant counter MGC increases its grant counter value. In this way, the master grant counter value is increased each time a downstream byte is transmitted by the central station CS. The above time reference information TRI is a copy of the master grant counter value generated by the cyclic master grant counter MGC. The access grant information AGI on the other hand, is generated by the processor P, temporarily stored in the access grant buffer B1, and supplied to the third input i3 of the multiplexer MUX. The downstream frames DF generated in this way are shown in FIG. 2A and were described above. Upstream bursts UB received by the central station CS are applied to the upstream burst output after being demodulated in the upstream demodulator UD.

Modulated downstream frames received by terminal station Ti are guided to the downstream demodulator DD by the upstream/downstream splitter S2. The modulated downstream frames then become demodulated and are applied to the demultiplexer input. Demultiplexer DEMUX demultiplexes the downstream frames DF to thereby generate the data Di, the time reference information TRIi and the access grant information AGIi, applied to the data output, the cyclic local grant counter LGC and the access grant buffer B2 respectively via the outputs o1, o2 and o3. For each downstream byte received by the downstream demodulator DD, this downstream demodulator DD, via the clock output thereof, applies a control signal to the cyclic local grant counter LGC to make it increase its local grant counter value. This local grant counter value is furthermore overwritten by the time reference information TRIi whenever such information is received. As a result, cyclic local grant counter LGC and cyclic master grant counter MGC remain synchronized. The cyclic local grant counter LGC further generates a zero crossing message at zero crossing moments of its local grant counter value, and supplies this message to the zero crossing input ZC of the logical "and" gate AND. Similarly, the access grant buffer B2 in terminal Ti generates an access grant message whenever an upstream time slot is allocated to the terminal Ti by the access grant information AGIi. This access grant message is applied to the access grant input AG of the logical "and" gate AND. Only when both messages are present at the logical and gate inputs, ZC and AG. The logical and gate AND then generates an upstream allowed message and applies this message to the control input of the upstream modulator UM, thereby activating this upstream modulator UM to transfer an upstream burst UB to the central station CS.

In an alternative embodiment (not shown), instead of permanently overwriting the local grant counter value whenever time reference information TRI is received, as already mentioned above, the local grant counter value can be adapted only when synchronization between cyclic local grant counter LGC and cyclic master grant counter MGC is lost. Means enabled to detect loss of synchronization are therefor shown in FIG. 6 and will be described in the following paragraphs.

Figure 6:
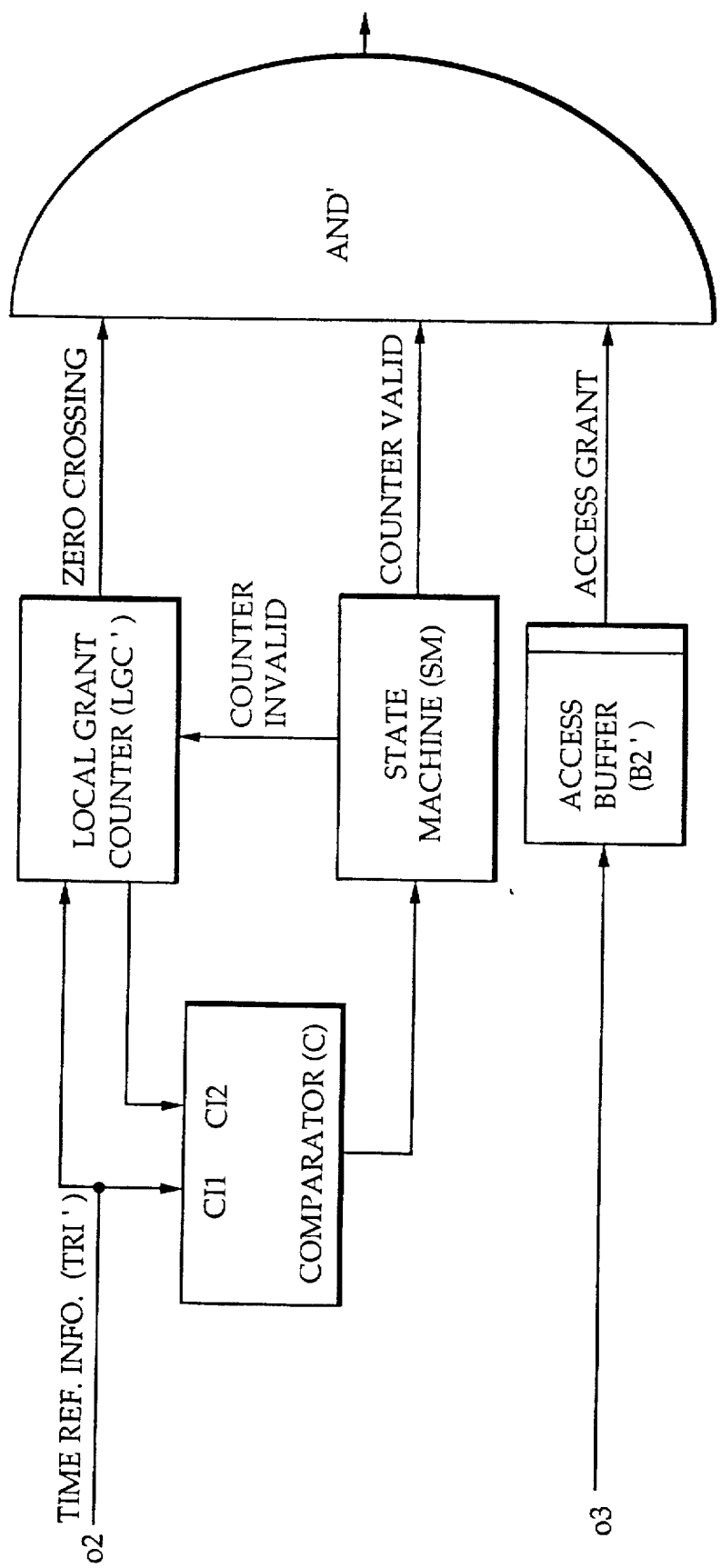
FIG. 6 is a block scheme of means included in an embodiment of the terminal station according to the present invention to enable restoration of the local grant counter value.

To obtain the above alternative embodiment, the cyclic local grant counter LGC of FIG. 5 has to be replaced by comparator means C, a cyclic local grant counter LGC' and a state machine SM shown in FIG. 6. Furthermore the logical "and" gate AND has to be replaced by a logical "and" gate AND' provided with an additional input CV, called a counter valid input. The second output o2 and third output o3 of the demultiplexer DEMUX in FIG. 5 are represented also by o2 and o3 in FIG. 6.

The second output o2 of demultiplexer DEMUX and an output of the cyclic local grant counter LGC' of FIG. 6 are coupled to a first input CI1 and second input CI2 of the comparator means C respectively. The second output o2 in addition also is coupled to an input of the cyclic local grant counter LGC'. A comparator means output is coupled to an input of the state machine SM, having a first output connected to a control input of the cyclic local grant counter LGC' and a second output connected to the counter valid input CV of the logical and gate AND'. Similar to FIG. 5, outputs of the cyclic local grant counter LGC' and of an access grant buffer B2' having the same function as B2 in FIG. 5, are connected to a zero crossing input ZC' and to an access grant input AG', similar to ZC and AG in FIG. 5, of the logical "and" gate AND' respectively. Although not shown in FIG. 6, an output of the logical "and" gate AND' again is coupled to a control input of an upstream modulator also included in the terminal station.

The comparator means compares the time reference information TRI', which is a copy of the master grant counter value, with the local grant counter value and applies a signal to the state machine SM if both differ. The state machine SM has to decide whether synchronization between the cyclic local grant counter and cyclic master grant counter still exists or is lost. When synchronism is lost, the state machine SM activates the cyclic local grant counter LGC' to overwrite its local grant counter value with the time reference information TRI' applied thereto via the multiplexer output o2. Otherwise, the state machine SM applies a counter valid message to the counter valid input CV of the logical and gate AND'. The decision with respect to synchronization is taken by the state machine SM in accordance with a predefined algorithm. The state machine SM e.g. waits until 5 consecutive local grant counter values differ from the received time reference information TRI' and then applies the activation signal to the cyclic local grant counter LGC'. An occasional difference between local grant counter value and time reference information TRI' is then regarded as a corrupted reception of the time reference information TRI'. The logical "and" gate AND' drawn in FIG. 6 thus only activates the upstream modulator at zero crossings of the cyclic local grant counter LGC', whereon an upstream time slot is allocated to the terminal station and whereon synchronization between the cyclic local and master grant counters still exists.

The working of the embodiment of the present network system shown in FIG. 5 and FIG. 6 is made only by way of a functional description of the blocks shown therein. Based on the above description, implementation of the functional blocks MUX, DEMUX, DM, DD, MGC, LGC, ... however is within the skill of a person skilled in the art and will therefore not be described in further details.

It is noted that the time division multiple access (TDMA) method according to the present invention can be implemented in cellular radio communication systems and satellite communication systems as well as in electrical or optical cable networks. The optical cable network can be implemented within a hybrid fiber coax (HFC) network, utilizing a cascade connection of optical fiber, a converting unit including an electro-optical convertor and an opto-electrical convertor and coax cables. Although the central station CS in FIG. 5 is coupled to the plurality of terminal stations, T1 ... Ti ... Tn, by means of the cascade connection of a common link and an individual link, the present method is not restricted to network systems having such physical links.

Furthermore it is noticed that the present method might be combined with frequency division multiplexing (FDM). The present method might for example be implemented for subgroups of a plurality of terminal stations, these subgroups further separated from each other by frequency division multiplexing (FDM).

While the principles of the invention have been described above in connection with specific apparatus, it is to be clearly understood that this description is made only by way of example and not as a limitation on the scope of the invention.

We claim:

1. A method for time division multiple access (TDMA) management in a system comprising a central station (CS) coupled to each of a plurality of terminal stations (T1 ... Ti ... Tn), said central station (CS) being enabled to transmit downstream frames (DF) to said terminal stations (T1 ... Ti ... Tn) and to allow said terminal stations (T1 ... Ti ... Tn) to transfer upstream bursts (UB) to said central station (CS) in time slots assigned thereto by means of access grant information (AGI) included in said downstream frames (DF), characterized in that a time slot of said time slots is bounded by a first and a second zero crossing of a cyclic local grant counter (LGC), included in each of said terminal stations (T1 ... Ti ... Tn) to generate a cyclic local counter value between zero and a predetermined number, and that a terminal station (Ti) of said terminal stations (T1 ... Ti ... Tn) is allowed to transfer a burst of said upstream bursts (UB) during said time slot, provided that said time slot became allocated to said terminal station (Ti) by said access grant information (AGI) before said first zero crossing, said cyclic local grant counter (LGC) being synchronized with a cyclic master grant counter (MGC) included in said central station (CS) to generate a counter value between zero and said predetermined number.

2. A method for time division multiple access (TDMA) management according to claim 1, characterized in that said cyclic master grant counter (MGC) is clocked each time a byte of a downstream frame (DF) of said downstream frames is transmitted by said central station (CS).

3. A method for time division multiple access (TDMA) management according to claim 1, characterized in that time reference information (TRI) generated by said cyclic master grant counter (MGC) is included in said downstream frames (DF) to enable said terminal stations (T1 ... Ti ... Tn) to adapt said cyclic local counter value whenever said cyclic local grant counter (LGC) is no longer synchronized with said cyclic master grant counter (MGC).

4. A method for time division multiple access (TDMA) management according to claim 1, characterized in that each said terminal station (Ti) stores a latest transferred upstream burst (UB) in a buffer included in said terminal station (Ti), and that said access grant information (AGI) includes a retransmission bit which is activated by said central station (CS) each time an upstream transmission error is detected to thereby ask said terminal station (Ti) to retransmit said latest transferred upstream burst (UB).

5. A method for time division multiple access (TDMA) management according to claim 1, characterized in that said access grant information (AGI) is aligned with said downstream frames (DF) and comprises identifiers of a number of said terminal stations (T1, ... Ti ... Tn) which are allowed to transfer said upstream bursts (UB) during said time slot.

6. A method for time division multiple access (TDMA) management according to claim 4, characterized in that a frame of said downstream frames (DF) comprises four Digital Video Broadcast frames according to a European Telecommunication Standard ETS 300 429, each frame of said Digital Video Broadcast frames including fourteen Asynchronous Transfer Mode cells, four bytes of said access grant information (AGI) identifying two of said terminal stations (T1 ... Ti ... Tn) and two bytes of time reference information (TRI), said Asynchronous Transfer Mode cells and said time reference information (TRI) being aligned in said frame of said downstream frames (DF).

7. A method for time division multiple access (TDMA) management according to claim 4, characterized in that a frame of said downstream frames (DF) comprises one Digital Video Broadcast frame according to a European Telecommunication Standard ETS 300 429, said Digital Video Broadcast frame including four bytes of said access grant information (AGI), two bytes of time reference information (TRI) and a plurality of Asynchronous Transfer Mode cells, said access grant information (AGI) and said time reference information (TRI) being aligned with said Digital Video Broadcast frame, and said Asynchronous Transfer Mode cells being not aligned with said Digital Video Broadcast frame.

8. A method for time division multiple access (TDMA) management according to claim 4, characterized in that said downstream frames (DF) are interleaved in said central station (CS) and deinterleaved in said terminal stations (T1 ... Ti ... Tn), and that said access grant information (AGI) occupies predetermined positions in said downstream frames (DF) thereby making said access grant information (AGI) available to said terminal stations (T1 ... Ti ... Tn) with less delay than the average delay introduced by said downstream frames (DF) interleaved in said central station (CS), provided that said access grant information (AGI) is separated from said downstream frames (DF) before said downstream frames (DF) become deinterleaved.

9. A method for time division multiple access (TDMA) management according to claim 1, characterized in that said access grant information (AGI) is transmitted at predetermined time intervals in such a way that said access grant information (AGI) is aligned with said upstream bursts (UB).

10. A method for time division multiple access (TDMA) management according to claim 8, characterized in that predetermined time intervals equal either a first fixed time interval (FT1) or a second fixed time interval (FT2) depending on whether said access grant information (AGI), when transmitted at said first fixed time interval (FT1), would or would not disturb overhead information (OHI) included in said downstream frames (DF) respectively.

11. Central station (CS) for a time division multiple access (TDMA) system, said central station (CS) being coupled to a plurality of terminal stations (T1 ... Ti ... TN) and including a multiplexer (MUX) to an input (i1) of which digital data (D) are applied and to another input (i3) of which access grant information (AGI), generated by a processor (P) which also forms part of said central station (CS), is applied, said multiplexer being adapted to multiplex said digital data (D) and said access grant information (AGI) to thereby generate downstream frames (DF) applied to a downstream modulator (DM), adapted to modulate said downstream frames (DF), characterized in that said central station (CS) further includes a cyclic master grant counter (MGC) adapted to generate a counter value clocked on activation of a clock (C), a terminal station (Ti) of said terminal stations for transferring an upstream burst (UB) during a time slot bounded by a first and a second zero crossing of a cyclic local grant counter (LGC) included in said terminal station (Ti), provided that said time slot became allocated to said terminal station (Ti) by said access grant information (AGI) before said first zero crossing, said cyclic local grant counter (LGC) further being synchronized with said cyclic master grant counter (MGC).

12. A terminal station (Ti) for a time division multiplex (TDMA) system wherein a central station (CS) is coupled to a plurality of terminal stations (T1 ... Ti ... Tn) similar to said terminal station (Ti), said terminal station (Ti) including a downstream demodulator (DD) provided to demodulate downstream frames (DF) transmitted from said central station (CS) to said terminal stations (T1 ... Ti ... Tn), and a demultiplexer (DEMUX) coupled to said downstream demodulator (DD) to demultiplex said downstream frames (DF) and to thereby generate digital data (D) provided from an output (o1) thereof and access grant information (AGI) provided from a further output (o3) thereof, characterized in that said terminal station (Ti) further includes a cyclic local grant counter (LGC) provided to generate a counter value between zero and a predetermined number, said cyclic local grant counter (LGC) being synchronized with a cyclic master grant counter (MGC) included in said central station (CS), an access grant buffer (B2) coupled to said further output (o3) of said demultiplexer (DEMUX) to temporarily store said access grant information (AGI), and an upstream modulator (UM) adapted to modulate and transfer an upstream burst (UB) to said central station (CS) between a first and a second zero crossing of said cyclic local grant counter (LGC) provided that a time slot was allocated to said terminal station (Ti) via said access grant information (AGI) previous to said first zero crossing.

13. A network system for time division multiple access (TDMA) including a central station (CS) coupled to a plurality of terminal stations (T1 ... Ti ... Tn), said central station (CS) including a multiplexer (MUX) to an input (i1) of which digital data (D) are applied and to another input (i3) of which access grant information (AGI), generated by a processor (P) which also forms part of said central station (CS), is applied, said multiplexer being adapted to multiplex said digital data (D) and said access grant information (AGI) to thereby generate downstream frames (DF) applied to a downstream modulator (DM), adapted to modulate said downstream frames (DF), and a terminal station (Ti) of said terminal stations (T1 ... Ti ... Tn) including a downstream demodulator (DD) provided to demodulate said downstream frames (DF), and a demultiplexer (DEMUX) coupled to said downstream demodulator (DD) to demultiplex said downstream frames (DF) and to thereby generate said digital data (D) provided at an output (o1) thereof and said access grant information (AGI) provided at a further output (o3) thereof, characterized in that said central station (CS) further includes a cyclic master grant counter (MGC) adapted to generate a counter value clocked on activation of a clock (C), and said terminal station (Ti) further includes a cyclic local grant counter (LGC) provided to generate a counter value between zero and a predetermined number, said cyclic local grant counter (LGC) being synchronized with said cyclic master grant counter (MGC), and an access grant buffer (B2) coupled to said further output (o3) of said demultiplexer (DEMUX) to temporarily store said access grant information (AGI), and an upstream modulator (UM) adapted to modulate and transfer an upstream burst (UB) to said central station (CS) between a first and a second zero crossing of said cyclic local grant counter (LGC) provided that a time slot was allocated to said terminal station (Ti) via said access grant information (AGI) previous to said first zero crossing.

14. A network system for time division multiple access (TDMA) according to claim 13, characterized in that said central station (CS) is coupled to said terminal stations (T1 ... Ti ... Tn) by means of a hybrid fiber coax (HFC) network comprising a cascade connection of an optical fiber, a converting unit including an electro-optical convertor and an opto-electrical convertor, and coax cables, and that subgroups of said terminal stations (T1 ... Ti ... Tn) are separated in downstream and upstream directions by frequency division multiplexing (FDM), each said subgroup including terminals which share a single upstream carrier by time division multiple access (TDMA) and which receive equal access grant information (AGI) via individual downstream channels, said individual downstream channels also being separated via frequency division multiplexing (FDM).

15. A network system for time division multiple access (TDMA) management according to claim 13, characterized in that said central station (CS) is coupled to said terminal stations (T1 ... Ti ... Tn) by means of a satellite communication system.

16. A network system for time division multiple access (TDMA) according to claim 13, characterized in that said central station (CS) is coupled to said terminal stations (T1 ... Ti ... Tn) by means of a cellular radio communication system.

* * * * *

UNITED STATES PATENT AND TRADEMARK OFFICE
CERTIFICATE OF CORRECTION

PATENT NO. : 5,754,535
DATED : May 19, 1998
INVENTOR(S) : Peter Vandenabeele, Christiaan Hendrik Jozef Sierens, Gert Van Der Plas, Cornelis Krijntjes It is certified that error appears in the above-identified patent and that said Letters Patent is hereby corrected as shown below:

Item [57], line 6 of the Abstract, cancel "(DE)" and substitute --(DF)-- therefor.

Signed and Sealed this

Eleventh Day of August 1998

Attest:

BRUCE LEHMAN

*Attesting Officer*     *Commissioner of Patents and Trademarks*